United States Patent

Senuma et al.

[11] Patent Number: 5,100,924

[45] Date of Patent: Mar. 31, 1992

[54] OPEN CELL FOAM COMPOSITIONS

[75] Inventors: Akitak A. Senuma; Kiroku Tsukada, both of Yokohama; Nobuaki Hirose, Fujisawa; Isao Noda, Yokosuka, all of Japan

[73] Assignee: Nippon Unicar Company Limited, Danbury, Conn.

[21] Appl. No.: 750,937

[22] Filed: Aug. 28, 1991

[51] Int. Cl.$^5$ ................................................ C08J 9/10
[52] U.S. Cl. ........................................ 521/95; 521/96; 521/134; 521/140; 521/154
[58] Field of Search ............... 521/134, 154, 140, 96, 521/95

[56] References Cited

U.S. PATENT DOCUMENTS

| | | | |
|---|---|---|---|
| 3,663,649 | 5/1972 | Wheeler | 260/827 |
| 3,865,897 | 2/1975 | Falender et al. | 260/827 |
| 3,887,601 | 6/1975 | Kanner et al. | 260/448.2 B |
| 4,252,915 | 2/1981 | Bartos | 525/106 |

Primary Examiner—Morton Foelak
Attorney, Agent, or Firm—Saul R. Bresch

[57] ABSTRACT

A composition comprising:
(i) a blend of a homopolymer of ethylene or a copolymer of ethylene and one or more comonomers; an organopolysiloxane; optionally, a monomeric diene; and, optionally, an organic peroxide, said blend having a gel content of at least about 10 percent by weight; and
(ii) a blowing agent.

20 Claims, No Drawings

OPEN CELL FOAM COMPOSITIONS

TECHNICAL FIELD

This invention relates to compositions useful in the preparation of open cell foams.

BACKGROUND INFORMATION

Open cell foams containing silicone compounds are known for their breathability, water absorption, and weatherability. Unfortunately, they also produce an exudate based on the same silicone compound, which degrades the appearance of, for example, automobile cushions made from silicone-containing foam. In addition to degrading the appearance of these articles of manufacture, the exudate causes the articles to stick to clothing and skin.

DISCLOSURE OF THE INVENTION

An object of this invention, therefore, is to provide a silicone-containing thermoplastic resin composition, which, on conversion to an open-cell foam, will be essentially free of exudate.

Other objects and advantages will become apparent hereinafter.

According to the invention, a composition has been discovered, which meets the above objective.

The composition comprises:

(i) a blend of a homopolymer of ethylene or a copolymer of ethylene and one or more comonomers and an organopolysiloxane; optionally, a monomeric diene; and, optionally, an organic peroxide, said blend having a gel content of at least about 10 percent by weight; and (ii) a blowing agent.

DETAILED DESCRIPTION

Generally, the comonomers useful in the Production of the copolymer of ethylene can have 3 to 20 carbon atoms and preferably will have 3 to 12 carbon atoms.

Examples of such comonomers are alpha-olefins such as propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene; other monomers such as styrene, p-methyl styrene, alpha-methyl styrene, vinyl naphthalene, and similar aryl olefins; nitriles such as acrylonitrile and methacrylonitrile; vinyl methyl ketone, vinyl methyl ether, and maleic anhydride; and acrylic acid, methacrylic acid, and other similar unsaturated acids. The resins are preferably non-halogenated.

Examples of homopolymers and copolymers of ethylene are high pressure, low density polyethylene; polyethylenes of various densities (high, medium, linear low, very low, and ultra-low) wherein the comonomer is 1-butene, 1-hexene, 4-methyl-1-pentene, or 1-octene; ethylene/propylene rubber; ethylene/propylene/diene monomer rubber; ethylene/vinyl acetate copolymer; ethylene/ethyl acrylate copolymer; isobutylene/isoprene rubber; and polybutene-1.

The organopolysiloxane can contain unsaturated or saturated aliphatic groups and aromatic groups. These groups are exemplified by vinyl, allyl, acryl, methacryl, methyl, ethyl, propyl, phenyl, tolyl, cychohexyl and cyclobutyl. The organopolysiloxane can also contain radicals such as halogen, cyano, and mercapto. The groups or radicals can be the same or different, and the molecular structure of the organopolysiloxane can be linear or cyclic and can contain straight or branched chains. A linear structure is preferred. While the number of siloxane units in the organopolysiloxane is not critical, 250 or more units are preferred. The viscosity of the organopolysiloxane can be at least about 10 centistokes at 23° C. and is preferably in the range of about 1000 to about 1,000,000 centistokes at 23° C. Viscosity is measured by using a Cannon-Fenske TM capillary viscometer according to ASTM D-445-61. When the viscosity is less than about 10 centistokes, there is a tendency towards exudation on the surface of the resulting foam. Preferred organopolysiloxanes are silicone gum and silicone oil.

One formula for a suitable organopolysiloxane can be written as follows:

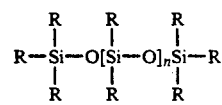

wherein

R is hydrogen or an unsubstituted or substituted monovalent hydrocarbyl radical; each R is the same or different; and n is at least about 10.

R is exemplified by hydrogen, alkyl such as methyl, ethyl, n-propyl, isopropyl, n-butyl, isobutyl, and tert-butyl, and phenyl. Each R can contain, for example, a vinyl group or a hydroxy group. The subscript n can be in the range of about 10 to about 10,000, is preferably in the range of about 100 to 1000, and more preferably at least about 250.

A preferred organopolysiloxane can have the following recurring unit:

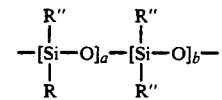

wherein R' is a monovalent unsaturated aliphatic group; R" is an unsubstituted or substituted monovalent saturated aliphatic or aromatic group; each R" is the same or different; $0 < a < 1$; $0.5 < b < 3$; and $1 < a + b < 3$.

An example of a specific recurring unit wherein $a + b = 2$; $a = 0.1$; and $b = 1.9$ follows:

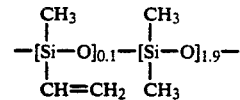

R' can be a vinyl or other alkenyl group having 2 to 10 carbon atoms and R" can be an alkyl such as methyl, ethyl, or propyl; an aryl such as phenyl or tolyl; or a cycloalkyl such as cyclohexyl or cyclobutyl. Substituents are exemplified by halogen, cyano, and mercapto radicals.

The blowing (or foaming) agents Preferably have a foaming or decomposition temperature in the range of about 90° to about 220° C. and are exemplified by azo-bisisobutyronitrile, azodicarbonamide, p-toluenesulfonyl hydroxide, 4,4'-oxybis(benzenesulfonyl hydroxide), n-heptane, n-octane, n-nonane, and n-decane. The decomposition temperatures of the blowing agents can be adjusted to be in the preferred range by adding accelerators such as calcium stearate, magnesium stearate, zinc stearate, glycerin, ethanolamine, urea, and zinc oxide. Additional blowing agents are mentioned in U.S. Pat. No. 3,855,378.

The monomeric diene can have 5 to 20 carbon atoms and is exemplified by 1,4-pentadiene, 1,5-hexadiene, 1,6-heptadiene, 1-10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, and 1,18-monodecadiene.

The organic peroxides, which can be used in this invention for crosslinking, preferably have a decomposition temperature in the range of about 100° to about 220° C. and about a 10 minute half life. Suitable organic peroxides are as follows (the decomposition temperature in ° C. is given in parentheses):

Succinic acid peroxide (110), benzoyl peroxide (110), t-butyl peroxy-2-ethylhexanoate (113), p-chlorobenzoyl peroxide (115), t-butyl peroxyisobutyrate (115), t-butyl peroxyisopropyl carbonate (135), t-butyl peroxylaurate (140), 2,5-dimethyl-2,5-di(benzoyl peroxy)hexane (140), t-butyl peroxyacetate (140), di-t-butyl peroxyphthalate (140), t-butyl peroxymaleate (140), cyclohexanone peroxide (145), t-butyl peroxybenzoate (145), dicumyl peroxide (150), 2,5-dimethyl-2,5-di(t-butyl peroxy)hexane (155), t-butyl cumyl Peroxide (155), t-butyl hydroperoxide (158), di-t-butyl peroxide (160), 2,5-dimethyl-2,5-di (t-butyl peroxy) hexene-3 (170), di-isopropylbenzene hydroperoxide (170), p-methane hydroperoxide (180), 2,5-dimethyl hexane-2,5-hydroperoxide (213).

For each 100 parts by weight ethylene homopolymer or copolymer, the proportions of components are about as follows:

| | | Parts by weight | |
|---|---|---|---|
| | Component | Broad | Preferred |
| (ii) | organopolysiloxane | 11 to 900 | 20 to 300 |
| (iii) | blowing agent | 1.5 to 30 | 3 to 10 |
| (iv) | monomeric diene | 0.6 to 30 | 2 to 15 |
| (v) | organic peroxide | 0.01 to 1 | 0.02 to 0.5 |

In order to prepare the gel product, the ethylene based polymer and the organopolysiloxane can be heat-kneaded together at a temperature of at least about 160° C., and preferably at least about 180° C., in kneading apparatus such as a Banbury TM mixer or a twin-screw extruder. The heat-kneading is continued until the blend has a gel content of at least about 10 percent by weight and preferably in the range of about 20 to about 70 percent by weight. The monomeric diene and the organic peroxide can be kneaded together with the ethylene based polymer and the organopolysiloxane.

The composition of the invention can contain a variety of conventional additives in conventional amounts, e.g., antioxidants, ultraviolet stabilizers, inorganic fillers, pigments, flame retardants, coupling agents, surfactants, antistatic agents, dyes, and smoke suppressants.

The blowing or foaming can be conducted at a temperature in the range of about 90° to about 300° C. under atmospheric pressure, and is preferably carried out in the range of about 120° to about 220° C. While crosslinking can be effected at the same temperature as foaming, a preferred range for accomplishing both is about 150° C. to 300° C.

Advantages of the open-cell foams, which are prepared from the compositions of this invention, are, in addition to good breathability, water absorption, and weatherability, good flexibility and suitability for use as vibration-proofing and shock absorbing materials for the protection of precision instruments and other cushioning applications and in packaging. Most importantly, there is essentially no exudation of the silicone. Thus, there is little or no staining of materials coming into contact with the foam nor the discomfort of stickiness, which is also characteristic of the exudate.

The patent mentioned in this specification is incorporated by reference herein.

The invention is illustrated by the following examples.

Gel content is determined by immersing a sample for 24 hours in toluene at 95° C. and vacuum-drying the sample for 24 hours. The difference in weight between the dried sample and the original sample is determined and then converted to weight percent based on the weight of the dried sample.

JIS (Japanese Industrial Standard) hardness is determined under JIS K 6301, Spring type hardness test (Type C).

The antioxidant, where used, is tetrakis [methylene (3,5-di-tert-butyl-4-hydroxy hydrocinnamate)] methane.

EXAMPLE 1

300 grams of an ethylene/vinyl acetate copolymer having a melt index of 1.5 and a vinyl acetate content of 20 percent by weight; 300 grams of silicone gum having a viscosity of 300,000 centistokes at 23° C. and having a methyl vinyl silicone content of 1 percent by weight (the other 99% by weight is made up of Si-0 units bearing methyl groups); 0.1 gram of dicumyl peroxide; and 0.1 gram of antioxidant are kneaded together at 100° C. from 5 minutes in a Brabender TM mixer and then at 160° for 15 minutes. The resulting kneaded substance has a gel content of 60 percent by weight.

300 grams of the kneaded substance, prepared above, and 20 grams of azodicarbonamide, a foaming agent, are kneaded together at 70° C. for 40 minutes in a roll mill and pelletized. The pellets are compression-molded into a sheet, one millimeter thick. The pressure and time are 100 kilograms per square centimeter and 5 minutes. The sheet is placed on a polyester sheet and inserted in an oven at 180° C. The sheet is removed from the oven and cooled to room temperature. The resulting foam is an open-cell foam having a thickness of 2 millimeters and an average cell diameter of 0.1 millimeter, is comfortable to the touch, and has a JIS hardness of 48, a maximum water absorption of 0.45 gram of water per gram of foam, and no exudation.

EXAMPLE 2

10 kilograms of high pressure polyethylene and 10 kilograms of dimethyl polysiloxane are kneaded at 180° C. for 7 minutes in a kneader having a blade rotation of 45 rpm. The gel content of the resulting kneaded substance is 65 percent by weight.

300 grams of this kneaded substance and 20 grams of azodicarbonamide are kneaded at 120° C. for 40 minutes in a roll mill and pelletized. The pellets are compression-molded at 130° C. into a sheet, 1 millimeter thick. The pressure and time are 100 kilograms per square meter and 10 minutes. The sheet is placed on a polyester sheet and placed in an oven at 210° C. The sheet homogeneously foams in 7 minutes. The foam is taken out of the oven and cooled to room temperature. The resulting foam is an open-cell foam having a thickness of 2 millimeters, an average cell diameter of 0.3 millimeter, a JIS hardness of 60, a maximum water absorption of 0.4 gram of water per gram of foam, and no exudation.

EXAMPLE 3

16 kilograms of ethylene/ethyl acrylate copolymer and 4 kilograms of dimethyl polysiloxane are kneaded at 180° C. for 70 minutes in a kneader having a blade rotating at 45 rpm. The resultant kneaded substance has a gel content of 25 percent by weight.

300 grams of this kneaded substance and 20 grams of azodicarbonamide are kneaded at 120° for 40 minutes in a roll mill and pelletized. The pellets are compression-molded at 100° into a sheet, one millimeter thick. The pressure and time are 100 kilograms per square centimeter and 5 minutes. The sheet is placed on a polyester sheet and inserted in an oven at 180° C. The sheet foams homogeneously in 7 minutes. The foam is removed from the oven and cooled to room temperature. The resulting foam is an open-cell foam having a thickness of 2.5 millimeters and an average cell diameter of 0.2 millimeter, is comfortable to the touch, has a JIS hardness of 52, a maximum water absorption of 1.2 grams of water per gram of foam, and no exudation.

EXAMPLE 4

300 grams of high pressure polyethylene and 20 grams of azodicarbonamide are kneaded at 120° C. for 40 minutes in a roll mill and pelletized. The pellets are compression-molded at 130° C. into a sheet, one millimeter thick. The pressure and time are 100 kilograms per square centimeter and 10 minutes. The sheet is placed on a polyester sheet and inserted in an oven at 210° C. to induce foaming. The resulting foam does not have homogeneous cells. The apparent JIS hardness of the foam is 90.

EXAMPLE 5

16 kilograms ethylene/ethyl acrylate copolymer and 4 kilograms of dimethyl polysiloxane are kneaded at 180° C. for 15 minutes in a kneader having a blade rotation of 45 rpm. The resulting kneaded substance has a gel content of 9.5 percent by weight.

300 grams of this kneaded substance and 20 grams of azodicarbonamide are kneaded at 70° C. for 40 minutes in a roll mill and pelletized. The pellets are compression-molded into a sheet, one millimeter thick. The pressure and time are 100 kilograms per square centimeter and 5 minutes. The sheet is placed on a polyester sheet and inserted in an oven at 180° C. to induce foaming. After 7 minutes, the foamed sheet is taken out of the oven and cooled to room temperature. Exudation of the silicone is observed on the surface of the foam.

EXAMPLE 6

30 grams of ethylene/vinyl acetate copolymer having a melt index of 15 and a vinyl acetate content of 20 percent by weight; 30 grams of silicone gum having a viscosity of 300,000 centistokes at 23° C. and a methyl vinyl silicone content of 1 percent by weight (the other 99% by weight is made up of Si-O units bearing methyl groups); 0.6 gram of 1,9-decadiene; 0.01 gram of dicumyl peroxide; and 0.01 gram of an antioxidant are kneaded in a Brabender TM mixer for 5 minutes at 100° C. and then for 15 minutes at 160° C. A product with a gel content of 60 percent by weight is prepared.

20 grams of azodicarbonamide and 300 grams of the above product are kneaded for 40 minutes in a roll mill at 70° C. and pelletized. The pellets are formed into a sheet, 1 millimeter thick, at 100° C. by compression molding. The pressure and time are 100 kilograms per square centimeter and 5 minutes.

The sheet is placed on a polyester sheet and inserted in an oven at 180° C. The sheet foams in 9 minutes. The foam is removed from the oven and cooled to room temperature. The resulting open-cell foam has a thickness of 2 millimeters, and average cell diameter of 0.1 millimeter, a good feel, a JIS hardness of 48, a maximum water absorption of 0.45 gram of water per gram of foam, and no exudation.

EXAMPLE 7

10 kilograms of high pressure polyethylene; 10 kilograms of dimethyl polysiloxane; and 0.2 kilogram of 1,13-tetradecadiene are kneaded at 180° C. for 70 minutes in a kneader rotating at 45 rpm. A product with a gel content of 65 percent by weight is prepared.

20 grams of azodicarbonamide and 300 grams of the above product are kneaded at 120° C. for 40 minutes in a roll mill and pelletized. The pellets are compression-molded into a one millimeter thick sheet at 130° C. The pressure and time are 100 kilograms per square centimeter and 10 minutes. The sheet is placed on a polyester sheet and inserted in an oven at 120° C. The sheet foams homogeneously in 7 minutes. The foam is taken out of the oven and cooled to room temperature. The resulting open-cell foam has a thickness of 2 millimeters, an average cell diameter of 0.3 millimeter, a good feel, a JIS hardness of 60, a maximum water absorption of 0.4 gram of water per gram of foam, and no exudation.

EXAMPLE 8

300 grams of high pressure polyethylene and 20 grams of azodicarbonamide are kneaded for 40 minutes in a roll mill at 120° C. and pelletized. The pellets are compression-molded into a 1 millimeter thick sheet at 130° C. The pressure and time are 100 kilograms per square centimeter and 10 minutes. The sheet is placed on a polyester sheet and inserted in an oven at 210° C. to cause it to foam. The resulting foam does not have homogeneous cells. The apparent JIS hardness of the foam is 90.

EXAMPLE 9

16 kilograms of ethylene/ethyl acrylate copolymer, 4 kilograms of dimethyl polysiloxane, and 0.2 kilogram of 1,13-tetradecadiene are kneaded for 70 minutes at 80° C. in a kneader running at 45 rpm. A product with a gel content of 25 percent by weight is prepared.

300 grams of the above product and 20 grams of azodicarbonamide are kneaded for 40 minutes in a roll mill and pelletized. The pellets are compression-molded into a 1 millimeter thick sheet at 100° C. The pressure and time are 100 kilograms per square centimeter and 5 minutes. The sheet is placed on a polyester sheet and inserted in an oven at 180° C. The sheet foams homogeneously in 7 minutes. The foam is taken out of the oven and cooled to room temperature. The resulting open-cell foam has a thickness of 2.5 millimeters, an average cell diameter of 0.2 millimeter, a good feel, a JIS hardness of 52, a maximum water absorption of 1.20 grams of water per gram of foam, and no exudation.

EXAMPLE 10

16 kilograms of ethylene/ethyl acrylate copolymer, 4 kilograms of dimethyl polysiloxane, and 0.2 kilogram of 1,13-tetradecadiene are kneaded at 180° C. for 15 minutes in a kneader run at 45 rpm. The product has a gel content of 9.5 percent by weight.

300 grams of the gel product and 20 grams of azodicarbonamide are kneaded for 40 minutes in a roll mill at 70° C. and pelletized. The pellets are compression-molded at 100° C. into a 1 millimeter thick sheet. The pressure and time are 100 kilograms per square centimeter and 5 minutes. The sheet is placed on a polyester sheet and inserted in an oven at 180° C. to cause foaming. After 7 minutes, the foamed sheet is removed from the oven and cooled to room temperature. Exudation of the silicone is observed on the surface of the foam.

We claim:

1. A composition comprising:
   (i) a blend of a homopolymer of ethylene or a copolymer of ethylene and one or more comonomers; an organopolysiloxane; optionally, a monomeric diene; and, optionally, an organic peroxide, said blend having a gel content of at least about 10 percent by weight; and
   (ii) a blowing agent;

2. The composition defined in claim 1 wherein the gel content is in the range of about 10 to about 80 percent by weight.

3. The composition defined in claim 1 wherein the organopolysiloxane has a viscosity of at least about 10 centistokes at 23° C.

4. The composition defined in claim 1 wherein the organopolysiloxane has a viscosity in the range of about 1000 to about 1,000,000 centistokes at 23° C.

5. The composition defined in claim 1 wherein the organopolysiloxane has about 10 to about 10,000 siloxane units.

6. The composition defined in claim 5 wherein the number of siloxane units is at least about 250.

7. The composition defined in claim 1 wherein the organopolysiloxane is a silicone gum or silicone oil.

8. The composition defined in claim 1 where the organopolysiloxane contains one or more ethylenically unsaturated groups.

9. The composition defined in claim 1 wherein the blowing agent has a foaming temperature in the range of about 90° C. to about 220° C.

10. The composition defined in claim 9 wherein the blowing agent is azodicarbonamide.

11. The composition defined in claim 1 wherein a monomeric diene having 5 to 20 carbon atoms is present.

12. The composition defined in claim 1 wherein an organic peroxide having a decomposition temperature in the range of about 90° C. to about 220° C. is present.

13. The composition defined in claim 1 wherein, for each 100 parts by weight of ethylene based polymer, the proportions of components are about as follows:

| Components | Parts by Weight |
|---|---|
| organopolysiloxane | 11 to 900 |
| blowing agent | 1.5 to 30 |
| diene | 0.6 to 30 |
| organic peroxide | 0.01 to 1 |

14. The composition defined in claim 1 wherein, for each 100 parts by weight of ethylene based polymer, the proportions of components are about as follows:

| Components | Parts by Weight |
|---|---|
| organopolysiloxane | 20 to 300 |
| blowing agent | 3 to 10 |
| diene | 2 to 15 |
| organic peroxide | 0.02 to 0.5 |

15. The composition defined in claim 1 wherein the ethylene based polymer is an ethylene/vinyl acetate copolymer or an ethylene/ethyl acrylate copolymer.

16. A composition comprising:
   (i) a blend of a homopolymer or copolymer of ethylene and one or more comonomers and an organopolysiloxane having a viscosity in the range of about 1000 to about 1,000,000 centistokes at 23°, said blend having a gel content in the range of about 10 to about 80 percent by weight, and for each 100 parts by weight of the homopolymer or copolymer of ethylene;
   about 20 to about 300 parts by weight of said organopolysiloxane;
   about 2 to about 15 parts by weight of a monomeric diene having 5 to 20 carbon atoms; and
   about 0.02 to about 0.5 by weight of an organic peroxide; and
   (ii) about 3 to about 10 parts by weight of a blowing agent.

17. The composition defined in claim 16 wherein the organopolysiloxane contains one or more ethylenically unsaturated groups.

18. A composition comprising:
   (i) a blend of an ethylene/vinyl acetate copolymer or an ethylene/ethyl acrylate copolymer and an organopolysiloxane having the following recurring unit:

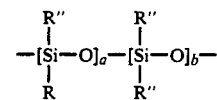

wherein R' is a monovalent unsaturated aliphatic group; R" is an unsubstituted or substituted monovalent saturated aliphatic or aromatic group; each R" is the same or different; $0<a<1$; $0.5<b<3$; and $1<a+b<3$, and having a viscosity in the range of about 1000 to about 1,000,000 centistokes at 23°, said blend having a gel content in the range of about 10 to about 80 percent by weight, and for each 100 parts by weight of copolymer;
   about 20 to about 300 parts by weight of said organopolysiloxane;
   about 2 to about 15 parts by weight of a monomeric diene having 5 to 20 carbon atoms;
   about 0.02 to about 0.5 by weight of an organic peroxide; and
   (ii) about 3 to about 10 parts by weight of a blowing agent.

19. A composition comprising:
   (i) a blend of an ethylene/vinyl acetate copolymer or an ethylene/ethyl acrylate copolymer and a silicone gum or a silicone oil having 250 to 10,000 siloxane units containing one or more ethylenically unsaturated groups, and having a viscosity in the range of about 1000 to about 1,000,000 centistokes at 23°, said blend having a gel content in the range of about 10 to about 80 percent by weight, and for each 100 parts by weight of copolymer;

about 20 to about 300 parts by weight of said silicone gum or silicone oil;

about 2 to about 15 parts by weight of a monomeric diene having 5 to 20 carbon atoms;

about 0.02 to about 0.5 by weight of an organic peroxide; and (ii) about 3 to about 10 parts by weight of azodicarbonamide.

20. A composition comprising:
(i) a blend of ethylene/vinyl acetate copolymer and an organopolysiloxane having 250 to 10,000 Si-0 units bearing methyl groups and one or more vinyl groups and having a viscosity in the range of about 1000 to about 1,000,000 centistokes at 23°, said blend having a gel content in the range of about 10 to about 80 percent by weight, and for each 100 parts by weight of copolymer;

about 20 to about 300 parts by weight of said organopolysiloxane;

about 2 to about 15 parts by weight of a monomeric diene having 5 to 20 carbon atoms; and about 0.02 to about 0.5 by weight of an organic peroxide; and (ii) about 3 to about 10 parts by weight of a blowing agent.

* * * * *